United States Patent [19]

Thomas

[11] 4,441,051

[45] Apr. 3, 1984

[54] LAMP SEAL GLASS

[75] Inventor: George L. Thomas, Chesterland, Ohio

[73] Assignee: General Electric Company, Schenectady, N.Y.

[21] Appl. No.: 350,678

[22] Filed: Feb. 22, 1982

[51] Int. Cl.³ .............................................. H01J 17/00
[52] U.S. Cl. .................................... 313/579; 313/623; 313/636; 313/315
[58] Field of Search ............... 313/315, 579, 623, 636; 501/69

[56] References Cited

U.S. PATENT DOCUMENTS

| | | | |
|---|---|---|---|
| 3,310,413 | 3/1967 | Harrington | 501/15 |
| 4,060,423 | 11/1977 | Thomas | 501/70 |
| 4,238,705 | 12/1980 | Thomas | 313/318 X |
| 4,302,250 | 11/1981 | Danielson | 501/70 |
| 4,366,409 | 12/1982 | Nieda et al. | 313/579 X |

Primary Examiner—Eugene R. LaRoche
Assistant Examiner—Vincent DeLuca
Attorney, Agent, or Firm—John F. McDevitt; Philip L. Schlamp; Fred Jacob

[57] ABSTRACT

A lamp seal glass is described suitable for direct hermetic sealing to molybdenum which consists essentially of oxides in approximate percent by weight 52–60 $SiO_2$, 11–17 $Al_2O_3$, 11–16 BaO, 8–12 CaO, and 3–7 $B_2O_3$, along with minor amounts of incidental impurities, residual fluxes and refining agents, said glass having a liquidus temperature no greater than about 1170° C., a softening point in the approximate range 900°–930° C., a strain point in the approximate range 650°–680° C., a working point in the approximate range 1180°–1240° C., and an average coefficient of linear thermal expansion in the 0°–300° C. temperature range between about $45$–$50 \times 10^{-7}$ cm/cm/°C. The glass composition enables improved manufacture of incandescent lamps operating in the moderately elevated temperature range 500°–650° C., especially regenerative cycle halogen lamps. In a preferred regenerative cycle halogen lamp, molybdenum inlead wires that are hermetically sealed to the glass envelope are further joined to larger diameter inlead wires exhibiting greater thermal expansion characteristics in the hermetic seal region.

3 Claims, 2 Drawing Figures

LAMP SEAL GLASS

BACKGROUND OF THE INVENTION

Aluminosilicate glasses useful as the lamp envelope for incandescent lamps being operated at elevated temperatures of 500° C. and higher have been known for some time. Aluminosilicate glasses suitable for direct hermetic sealing to molybdenum in the manufacture of other electrical devices such as electronic tubes are also well-known. While said prior art glasses permit lamp operation at the desired elevated temperatures, various problems are still encountered both during lamp manufacture and subsequent lamp operation with the existing glasses. In U.S. Pat. No. 3,310,413, there is disclosed an aluminosilicate glass consisting essentially of in weight percent: 53.5–59.5 $SiO_2$, 13.0–16.5 $Al_2O_3$, 4.0–9.0 $B_2O_3$, 8.5–15.0 CaO, 0–5.0 MgO and 5.5–11.5 BaO which is said to provide a liquidus temperature less than about 1125° C. and a viscosity of about 30,000 poises or greater at said liquid temperature in order to prevent the glass devitrification when sealed directly to molybdenum. The desired improvement is attributed to a low MgO content while an undesirably low viscosity at liquidus is said to result from an excess of $SiO_2$, $Al_2O_3$, MgO, CaO or BaO as well as lesser amounts of $SiO_2$, $Al_2O_3$, $B_2O_3$, CaO or BaO. An MgO content in the range 1–4% is also said to be needed to achieve a linear coefficient thermal expansion of $46 \times 10^{-7}$ cm/cm/°C. between 0° and 300° C. A more recently issued U.S. Pat. No. 4,302,250 discloses an aluminosilicate glass said to be useful for tungsten halogen lamps that require direct hermetic sealing to molybdenum inleads which consist essentially of 64–68% $SiO_2$, 11–14% CaO, 16.5–18.5 $Al_2O_3$, and 2–6.5% SrO+BaO, consisting of 0–4% SrO and 0.5% BaO. It is again required that said glass exhibit a liquidus temperature below 1300° C. along with a viscosity of 30,000 poises at said liquid temperature in order to avoid glass devitrification when the glass tubing employed in lamp manufacture is initially formed. A strain point of at least 750° C. is also said to be required to avoid stress in the glass-to-metal seals during lamp operation. Some BaO is said to be needed in said glass to prevent excessive liquidus temperatures although an amount greater than 5% by weight is said to produce strain points which are too low and coefficients of thermal expansion which are too high.

SUMMARY OF THE INVENTION

It has now been discovered that manufacture and operation of incandescent lamps having service temperatures at 500° C. and higher and which involve direct hermetic sealing to molybdenum are both improved with a particular glass composition consisting essentially of oxides in approximate percent by weight 52–60 $SiO_2$, 11–17 $Al_2O_3$, 11–16 BaO, 8–12 CaO, and 3–7 $B_2O_3$ along with minor amounts of incidental impurities, residual fluxes and refining agents. Said glass material permits sealing to the inlead wires at lower temperatures which helps avoid damage to these metal parts. A closer expansion match in the glass-to-metal seal is also experienced over the entire lamp operating temperature range. The significantly more elevated BaO content in the present glass provides several important advantages. Glass viscosity at the liquidus temperature is found to increase with the higher BaO content which enables the glass to be worked at temperatures above the liquidus temperature where the devitrification problem is encountered. Correspondingly, the liquidus temperature is decreased more with BaO than occurs with other alkaline earth oxides thereby decreasing the occurrence of devitrification when the glass is worked to an even greater extent. The increased BaO level in the glass further elevates the softening point along with the strain point as again compared with other alkaline earth oxides thereby helping decrease seal stresses while increasing lamp operating temperatures, especially for regenerative cycle halogen lamps.

In a preferred lamp embodiment, an improved incandescent lamp is provided having a transparent glass envelope which includes a resistive incandescent filament connected to a pair of molybdenum inlead wires that are hermetically sealed to the glass envelope, wherein the improvement comprises a glass composition which consists essentially of oxides in approximate percent by weight 52–60 $SiO_2$, 11–17 $Al_2O_3$, 11–16 BaO, 8–12 CaO, and 3–7 $B_2O_3$ along with minor amounts of incidental impurities, residual fluxes and refining agents, said glass having a liquidus temperature no greater than about 1170° C., a softening point in the approximate range 900°–930° C., a strain point in the approximate range 650°–680° C., a working point in the approximate range 1180°–1240° C., and an average coefficient of linear thermal expansion in the 0°–300° temperature range between about $45$–$50 \times 10^{-7}$ cm/cm/°C. Minor amounts of alkali metal oxides can be included in said glass up to approximately 3% by weight in order to reduce a reboil tendency in the glass when a hermetic seal is formed during incandescent lamp manufacture other than regenerative cycle halogen lamps where alkali metal oxide incorporation produces difficulty during lamp operation. In the latter type incandescent lamps, however, optional amounts of ultraviolet absorbing ions can be incorporated in the present glass up to or approximately 0.5% by weight so that conventional metal oxides used for this purpose such as $TiO_2$, $CeO_2$, $Sb_2O_3$, and $V_2O_5$ are contemplated.

In an especially preferred regenerative cycle halogen lamp embodiment of the present invention, said improved lamp comprises a transparent glass envelope which includes a resistive incandescent filament connected to a pair of molybdenum inlead wires that are hermetically sealed to the glass envelope, said glass envelope comprising a glass composition which consists essentially of oxides in approximate percent by weight 52–60 $SiO_2$, 11–17 $Al_2O_3$, 11–16 BaO, 8–12 CaO, and 3–7 $B_2O_3$, along with minor amounts of incidental impurities, residual fluxes and refining agents, said glass having a liquidus temperature no greater than about 1170° C., a softening point in the approximate range 900°–930° C., a strain point in the approximate range 650°–680° C., a working point in the approximate range 1180°–1240° C., and an average coefficient of linear thermal expansion in the 0°–300° C. temperature range between about $45$–$50 \times 10^{-7}$ cm/cm/°C., with said molybdenum inlead wires being joined to larger diameter inlead wires having greater thermal expansion characteristics in the hermetic seal region. Said larger diameter inleads of the improved lamp construction serve to provide adequate mechanical support means for the entire lamp. Joinder of the different size inleads at the hermetic seal region permits reliable hermetic sealing only to the smaller diameter inleads since it is not required that the larger diameter inleads extending therefrom and projecting outwardly from the lamp glass envelope also be hermetically sealed to the glass. Since the hermetic sealing of the larger diameter inleads has been obviated in this manner, there is no longer need for said larger diameter inleads to exhibit thermal expansion characteristics suitable for direct sealing to the lamp glass envelope and less expensive metals than molybdenum can be employed for said components. Accordingly, known iron alloys including Kovar-type alloys and other conductive metals now used as inlead materials for incandescent lamp construction can serve as the larger diameter inleads for the presently improved lamp.

DESCRIPTION OF THE PREFERRED EMBODIMENTS

Figure 1:
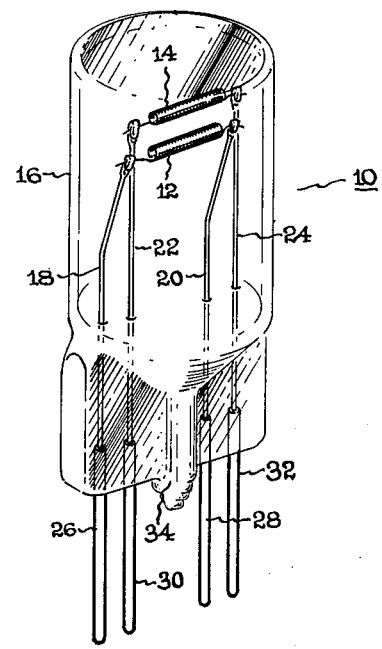
FIG. 1 depicts in perspective a preferred regenerative cycle halogen lamp made in accordance with the present invention.

Referring to FIG. 1, there is shown in perspective a tungsten-halogen cycle lamp construction 10 having a pair of resistive incandescent filaments 12 and 14 hermetically enclosed within a transparent envelope 16 of the present glass material. Each of said filaments 12 and 14 are connected to a pair of inleads 18–20 and 22–24, respectively, with all four of said inleads being hermetically sealed at one end of the tubular-shaped lamp glass envelope. The exteriormost end of said inleads 18, 20, 22 and 24, however, is joined by conventional means such as brazing or welding to relatively larger diameter inlead wires 26, 28, 30 and 32, respectively, at the hermetic seal region 34 of said lamp construction. By said means, a direct vacuum-type pinch seal of the innermost smaller diameter inleads 18–24 is achieved along with providing adequate mechanical support for the entire lamp construction with the unconnected ends of the larger diameter inleads 26–32 protruding outwardly from the lamp glass envelope. As previously indicated, said larger diameter inleads do not reside within the actual sealing region and are thereby not hermetically sealed in the lamp construction. Not shown in said lamp construction is the conventional inert gas filling which further includes a halogen such as iodine, bromine, or some volatile organo halide compound to produce the well-known tungsten-halogen cycle. As further previously indicated, an important benefit achieved during lamp manufacture with the present glass occurs upon sealing the glass to the molybdenum inleads since the glass softens and seals before damaging the wire construction.

Figure 2:
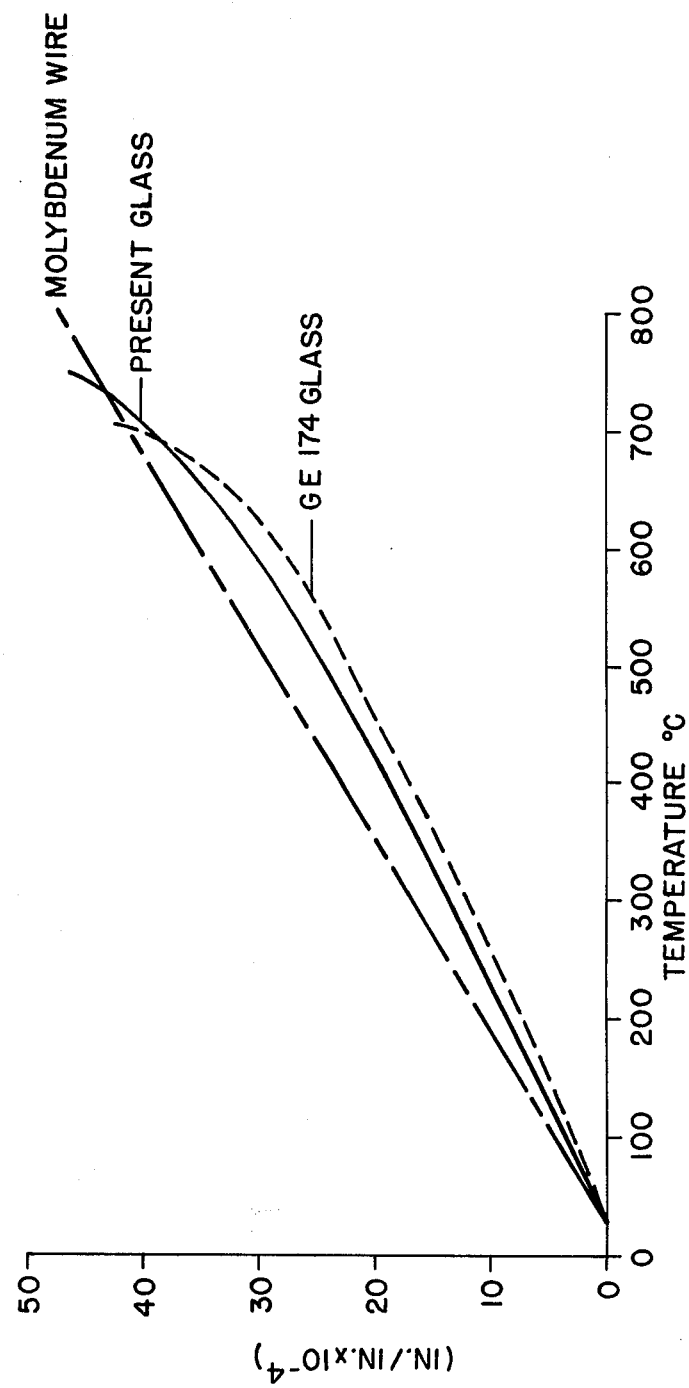
FIG. 2 is a graph to illustrate thermal expansion behavior in said lamp construction.

Still another important benefit achieved with use of the present glass in the above described lamp embodiment is attributable to a closer thermal expansion match between said glass and the molybdenum inleads sealed thereto over the entire lamp operating temperature range. More particularly, comparative thermal expansion behavior for a prior art GE 174 glass used commercially for some time in said type lamp construction is depicted graphically in FIG. 2 along with that for the present glass and molybdenum wire. As can be noted from the reported thermal expansion curves, the present glass exhibits a far closer match to molybdenum wire over the entire temperature region depicted as compared with the reported prior art glass. Said prior art glass can be particularly observed to experience the greatest mismatch at temperatures above 300° C. which indicates greater potential for cracking or leaking in the glass-to-metal seal region when this type lamp is manufactured as well as during subsequent lamp operation.

Preferred glass according to the present invention are reported in Table I below. The glass material can be drawn into tubing by conventional methods from a glass melting furnace where melting and homogenizing takes place. The chemical composition of said glass based on oxide content in approximate percent by weight is reported along with strain point, softening point, liquidus temperature, and linear thermal expansion coefficient to illustrate the optimum physical characteristics exhibited for lamp seal glass applications.

TABLE I

| Example: (Wt. %) | GE174 | #1 | #2 | #3 | #4 | #5 | #6 |
|---|---|---|---|---|---|---|---|
| $SiO_2$ | 58.98 | 57.18 | 56.19 | 55.91 | 57.34 | 54.61 | 54.93 |
| $Al_2O_3$ | 15.99 | 12.48 | 12.27 | 14.64 | 11.95 | 14.29 | 14.38 |
| BaO | 11.26 | 15.59 | 15.59 | 15.43 | 15.28 | 15.06 | 14.83 |
| CaO | 8.29 | 11.06 | 10.93 | 10.84 | 10.67 | 10.61 | 10.47 |
| $B_2O_3$ | 3.66 | 3.59 | 4.93 | 3.06 | 4.62 | 5.31 | 5.31 |
| $F_2$ | 0.45 | 0.07 | 0.05 | 0.09 | 0.09 | 0.09 | 0.06 |
| $SO_3$ | — | 0.03 | 0.04 | 0.03 | 0.05 | 0.03 | 1.02 |
| MgO | 1.37 | — | — | — | — | — | — |
| Liquidus Pt. (°C.) | 1140 | 1162 | 1105 | 1145 | 1134 | 1086 | 1162 |
| Soft. Pt. (°C.) | 930 | 921 | 902 | 921 | 903 | 907 | 923 |
| Strain Pt. (°C.) | 650 | 685 | 671 | 678 | — | 668 | 679 |
| Exp. Coef. (0–300° C.)/°C. | 43.5 | 48.8 | 49.6 | 48.7 | 49.0 | 48.6 | 48.1 |
| Work. Pt. (°C.) | 1270 | 1215 | 1210 | 1235 | 1205 | 1195 | 1210 |

As can be noted from the foregoing table, the liquidus temperature in the reported glasses is kept below about 1170° C. primarily by maintaining the $B_2O_3$, $Al_2O_3$, and BaO content within the ranges specified for said glass composition.

It will be apparent from the foregoing description, therefore, that a novel seal glass for incandescent lamp construction is provided affording significant advantages for direct hermetic seal to the molybdenum inlead wires. It will also be apparent that minor variations in the disclosed glass compositions other than above specifically disclosed are contemplated for use such as by optional incorporation of ultraviolet absorbing ions, MgO or even alkali metal oxides depending upon the particular lamp product application. Understandably, various type incandescent lamp constructions that employ but a single filament as the light source can also be benefited with the present inmprovement. It is intended to limit the present invention, therefore, only by the scope of the following claims.

What I claim as new and desire to secure by United States Letters Patent is:

1. An improved regenerative cycle halogen lamp operating at temperatures of at least 500° C. having a transparent glass envelope which includes a resistive incandescent filament connected to a pair of molybdenum inlead wires that are hermetically sealed to the glass envelope, said molybdenum inlead wires being joined to larger diameter inlead wires having greater thermal expansion characteristics in the hermetic seal region, and an inert gas filling which further includes a halogen, wherein the improvement comprises a glass which consists essentially of oxides in approximate percent by weight 52–60 $SiO_2$, 11–17 $Al_2O_3$, 11–16 BaO, 8–12 CaO, and 3–7 $B_2O_3$, along with minor amounts of incidental impurities, residual fluxes, and refining agents, said glass having a liquidus temperature no greater than about 1170° C., a softening point in the approximate range 900°–930° C., a strain point in the approximate range 650°–680° C., a working point in the approximate range 1180°–1240° C., and an average coefficient of linear thermal expansion in the 0°–300° C. temperature range between about $45-50 \times 10^{-7}$ cm/cm/°C., to reduce both expansion mismatch and thermal stresses otherwise occuring in said hermetic seal region at the lamp operating temperatures.

2. A lamp as in claim 1 wherein the glass further contains up to approximately 3% by weight of alkali metal oxide.

3. A lamp as in claim 1 wherein the glass further contains up to approximately 0.5% by weight of ultraviolet absorbing ions.

* * * * *